Aug. 19, 1924.
J. F. HURD
SIGNAL
Filed Aug. 21, 1923
1,505,147
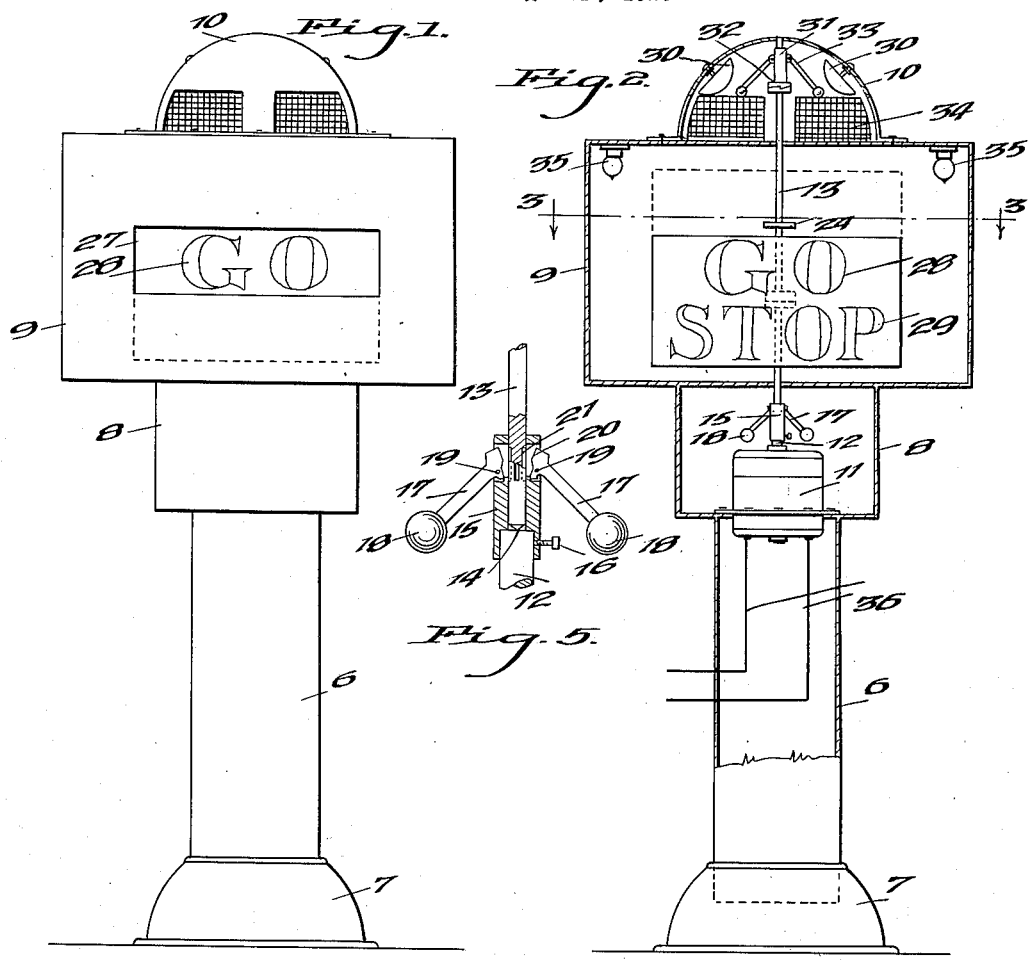
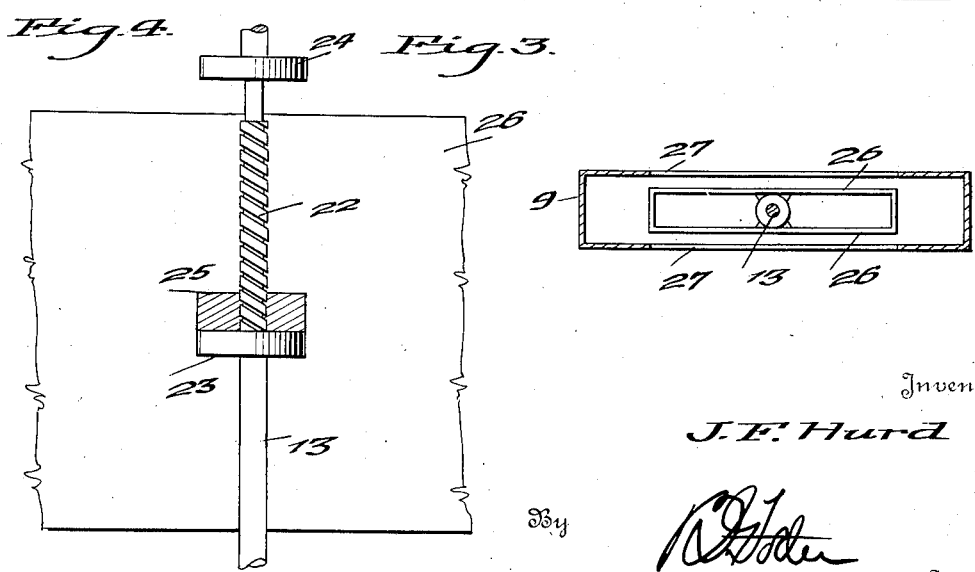

Patented Aug. 19, 1924.

1,505,147

UNITED STATES PATENT OFFICE.

JOHN F. HURD, OF WATSEKA, ILLINOIS; LAURA E. HURD ADMINISTRATOR OF SAID JOHN F. HURD, DECEASED.

SIGNAL.

Application filed August 21, 1923. Serial No. 658,611.

*To all whom it may concern:*

Be it known that I, JOHN F. HURD, a citizen of the United States, residing at Watseka, in the county of Iroquois and State of Illinois, have invented certain new and useful Improvements in Signals, of which the following is a specification.

The present invention relates to signals, and while particularly intended for indicating danger and safety conditions at highway crossings of railways, is not necessarily limited to that use.

The principal object is the provision of a simple and effective signal that will normally indicate safety but on the approach of danger or other traffic conditions that prohibit crossing at intersecting ways, will promptly and effectively show such danger.

In the accompanying drawings:—

Figure 1 is a side elevation of the preferred embodiment of the invention,

Figure 2 is a vertical sectional view therethrough,

Figure 3 is a horizontal sectional view on the line 3—3 of Figure 2,

Figure 4 is a detail sectional view showing the operating means for the target,

Figure 5 is a detail sectional view of the centrifugal clutch mechanism between the driving and driven members.

In the embodiment disclosed, a casing is employed, preferably comprising a hollow standard 6, supported on a suitable base 7, and having an enlargement 8 at its upper end, said enlargement supporting a head 9 surmounted by a dome 10.

In the enlargement 8 is located a vertically arranged electric motor 11 having a motor shaft 12 projecting above it, said motor and shaft constituting a driving member. A driven member in the form of a vertical shaft 13 is located axially of and above the motor shaft 12, preferably having a step bearing 14 on the shaft 12. The lower end of the shaft 13 is journaled in a sleeve 15 fixed to the upper end of the motor shaft 12 by a set screw 16, or by any other suitable means. This sleeve constitutes a carrier for a pair of centrifugal arms 17 having their outer free ends weighted, as shown at 18, the inner ends of the arms being pivoted in the sleeve 15, as shown at 19, and having portions 20 that are adapted to engage in grooves or slots 21 formed in the lower end of the driven shaft 13.

The shaft 13 is provided with a screw threaded portion 22 extending from a lower stop collar 23 upwardly toward but terminating short of an upper stop collar 24. Engaged with this screw is a nut 25 carrying one or more targets 26 that are located within the head casing 9 and are adapted to be moved upwardly when the shaft 13 is rotated in one direction. These targets 26 are placed behind view openings 27 in the head casing 9, and when the nut 25 is on the lower stop collar 23, the upper portions of the targets appear behind the said view openings. These portions preferably have the word "Go", as indicated at 28, or other suitable safety indications. The lower portions of the targets are hidden behind the casing wall, and preferably have danger indications, as for example the word "Stop", shown at 29.

The dome 10 houses one or more bells 30, and the driven shaft 13 extends into said dome, as illustrated in Figure 2. On the portion of the shaft 13 within the dome is a sleeve 31 having a ratchet clutch connection 32 with said shaft. The sleeve 31 carries centrifugally operating arms 32 pivoted to said sleeve and adapted to strike against the bells 26 when the shaft 13 is rotated. This dome is preferably provided with sound outlet openings that may be screened, as shown at 34. The interior of the head casing 29 may also be illuminated by electric lights, as illustrated at 35.

When the signal is used at a railway crossing the leads to and from the motor, shown at 36, are suitably connected in an electric circuit controlled in any suitable manner by the passage of a train approaching the crossing, it being understood that when the train reaches a predetermined position ahead of the crossing the circuit will be closed, so that the motor 11 will be thrown into operation, and as soon as the train reaches or passes the crossing the circuit will be again broken, cutting out the motor, so that it will again come to a standstill. When the motor is thrown into operation, its shaft 12 will obviously be rotated and as the sleeve 15 and arms 17 are coupled to it, they will also be rotated. As a consequence the arms 17 will be swung outwardly, causing the driven shaft 13 to be clutched to the motor shaft, and effecting its rotation. The targets which are in their lowermost position and indicating safety are thereby raised to show the danger signal "Stop," and thus indicating the approach of danger. At the same time the bells are sounded by the rapidly rotating arms 33 striking against them, so that both visual and audible signals of danger are given. As soon as the circuit, which includes the motor 11, is broken, and the motor ceases to operate the arms 17 swing downwardly, thereby releasing the shaft 13. The targets thereupon will gravitate again to their lower position, the pitch of the screw 22 being such that said targets will rotate the shaft 13 rearwardly, thus bringing the parts back to their initial or normal safety condition.

From the foregoing, it is thought that the construction, operation and many advantages of the herein described invention will be apparent to those skilled in the art, without further description and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. A signal of the character described, comprising a movable driving member, a movable driven member, a signal operated by the driven member, and means for automatically connecting the driving member and driven member to cause the former to operate the latter when the former is operated and releasing the two when the driving member ceases operation.

2. A signal of the character described, comprising a movable driving member, a movable driven member, a signal operated by the driven member, and a centrifugal clutch operated by the driving member, said clutch automatically connecting the driving and driven members to actuate the latter by the former when the former is operated and automatically release said driven member when the driving member is stopped.

3. A signal of the character described, comprising a driving member, a driven shaft having a screw, a target that is engaged and moved by the screw, and a centrifugal clutch operated by the driving member, said clutch automatically coupling the driven shaft to the driving member when the latter is operated and automatically releasing said shaft when the driving member is stopped.

4. A signal of the character described, comprising a motor, a movable driven member, a target moved by the driven member between a "safe" and a warning position, and means operated by the motor when said motor is actuated for automatically clutching the driven member thereto and causing its operation thereby to move the target to a warning position, said means automatically releasing the driven member and target when the motor stops and permitting the target to reassume its "safe" position independent of the motor.

5. In a signal of the character described, the combination with a casing, of a warning target normally movable upwardly from and downwardly to a hidden position in said casing, a motor member, and means actuated by the motor member to elevate the target to a visible position, said motor member and means permitting the target to automatically gravitate to its hidden position when the motor member stops.

6. In a signal of the character described, the combination with a casing having a view opening, of a motor housed therein, an upright driven shaft, a centrifugal clutch operated by the motor when in action for clutching the shaft to the motor and releasing it when the motor is inactive, a target movable between a warning position across the view opening and a position hidden by the casing, and means operated by the driven shaft for moving it from one to the other of the positions when the shaft is actuated by the motor and permitting its return when the shaft is freed from the motor.

7. In a signal of the character described, the combination with a casing having a view opening, of a motor housed therein, an upright driven shaft, a centrifugal clutch operated by the motor when in action for clutching the shaft to the motor and releasing it when the motor is inactive, a target movable between a warning position across the view opening and a position hidden by the casing, a screw on the shaft, and a nut on the target engaged by the screw.

8. In a signal of the character described, the combination with a casing having a view opening, of a motor in the casing having an upright shaft, an upright driven shaft coaxially with the motor shaft and transverse to the view opening, a centrifugal clutch on the motor shaft for connecting it to the driven shaft when the motor is actuated, a screw on the driven shaft, and a target in the casing having a nut engaged by the screw, said target being carried into a position behind the view opening when the driven shaft is actuated.

9. In a signal of the character described, the combination with a movable driving member, of a movable driven member, means for automatically connecting the driving member and driven member when the former is operated to cause the driving member to move the driven member and releasing the two when the driving member ceases operation, and audible and visual signals operated by the driven member.

10. In a signal of the character described, the combination with a casing having a view opening, of a motor in the casing having an upright shaft, an upright driven shaft coaxially with the motor shaft and transverse to the view opening, a centrifugal clutch on the motor shaft for connecting it to the driven shaft when the motor is actuated, a screw on the driven shaft, a target in the casing having a nut engaged by the screw, said target being carried into a position behind the view opening when the driven shaft is actuated, a bell, and a tapper for the bell operated by the driven shaft.

In testimony whereof, I affix my signature in the presence of two witnesses.

JOHN F. HURD.

Witnesses:
BERT BURDICK,
J. G. WILLIAMS.